(12) United States Patent
Arigoni et al.

(10) Patent No.: US 10,464,620 B2
(45) Date of Patent: Nov. 5, 2019

(54) VEHICLES CONFIGURED FOR NAVIGATING SURFACE TRANSITIONS

(71) Applicants: DISNEY ENTERPRISES, INC., Burbank, CA (US); ETH Zürich, Zürich (CH)

(72) Inventors: Michael Arigoni, Zürich (CH); Robert Simpson, Zürich (CH); Silvan Fuhrer, Zürich (CH); Paul Beardsley, Zürich (CH); Dario Mammolo, Zürich (CH); Michael Burri, Zürich (CH); Michael Bischoff, Zürich (CH); Thomas Stastny, Zürich (CH); Lennon Rodgers, Zürich (CH); David Krummenacher, Zürich (CH); Roland Siegwart, Zürich (CH)

(73) Assignees: Disney Enterprises, Inc., Burbank, CA (US); ETH Zürich, Zürich (CH)

( * ) Notice: Subject to any disclaimer, the term of this patent is extended or adjusted under 35 U.S.C. 154(b) by 522 days.

(21) Appl. No.: 15/199,897

(22) Filed: Jun. 30, 2016

(65) Prior Publication Data
US 2018/0001945 A1    Jan. 4, 2018

(51) Int. Cl.
*B62D 57/024*  (2006.01)
*B62D 57/04*   (2006.01)
*G05D 1/08*    (2006.01)
*G05D 1/10*    (2006.01)
*G05D 1/02*    (2006.01)

(52) U.S. Cl.
CPC .......... *B62D 57/024* (2013.01); *B62D 57/04* (2013.01); *G05D 1/027* (2013.01); *G05D 1/08* (2013.01); *G05D 1/0891* (2013.01); *G05D 1/10* (2013.01)

(58) Field of Classification Search
CPC .... B62D 57/024; B62D 57/04; G05D 1/0891; G05D 1/10; B60V 3/02; B60V 3/025; B64C 29/00; B64C 29/0025; B64C 29/0033; B64C 29/0075
See application file for complete search history.

(56) References Cited

U.S. PATENT DOCUMENTS

| | | | | |
|---|---|---|---|---|
| 3,184,183 A * | 5/1965 | Plasecki | ............ | B64C 27/20 244/23 R |
| 3,494,575 A * | 2/1970 | Budworth | ............ | B64C 37/00 244/12.1 |
| 3,827,527 A * | 8/1974 | Bertelsen | ............ | B60V 1/043 180/120 |
| 4,537,372 A * | 8/1985 | Forizs | ............ | B64C 29/0033 244/12.4 |
| 6,708,920 B2 * | 3/2004 | Fukuyama | ............ | B64C 27/20 244/12.4 |
| 8,833,692 B2 * | 9/2014 | Yoeli | ............ | B64C 29/0025 244/23 A |
| 9,085,355 B2 * | 7/2015 | DeLorean | ............ | B64C 29/0033 |
| 9,592,908 B2 * | 3/2017 | Gentry | ............ | B64C 25/10 |
| 9,688,400 B2 * | 6/2017 | Hutson | ............ | B64C 39/024 |

(Continued)

*Primary Examiner* — Joseph M Rocca
*Assistant Examiner* — Maurice L Williams
(74) *Attorney, Agent, or Firm* — Esplin & Associates, PC

(57) ABSTRACT

A vehicles configured for navigating surface transitions. Navigation of surface transitions is controlled by information obtained by sensors carried by the vehicle. The vehicle may be propelled forward using force generated by tiltable propellers carried by the vehicle.

20 Claims, 7 Drawing Sheets

(56) References Cited

U.S. PATENT DOCUMENTS

| | | | | |
|---|---|---|---|---|
| 2002/0060267 A1* | 5/2002 | Yavnai | G05D 1/0038 | 244/23 A |
| 2003/0080242 A1* | 5/2003 | Kawai | B64C 11/001 | 244/12.4 |
| 2005/0230524 A1* | 10/2005 | Ishiba | B60F 5/02 | 244/23 A |
| 2006/0226281 A1* | 10/2006 | Walton | B64C 27/20 | 244/17.23 |
| 2007/0034738 A1* | 2/2007 | Sanders, Jr. | B64C 27/12 | 244/23 A |
| 2007/0034739 A1* | 2/2007 | Yoeli | B64C 1/1415 | 244/23 R |
| 2009/0008499 A1* | 1/2009 | Shaw | B64C 27/20 | 244/17.23 |
| 2009/0203292 A1* | 8/2009 | Clark, Jr. | A63H 17/26 | 446/454 |
| 2012/0234968 A1* | 9/2012 | Smith | B64C 29/0033 | 244/12.3 |
| 2013/0024067 A1* | 1/2013 | Troy | B25J 5/007 | 701/36 |
| 2016/0101853 A1* | 4/2016 | Toppenberg | B64C 39/12 | 244/7 A |
| 2016/0114887 A1* | 4/2016 | Zhou | B60F 5/02 | 348/148 |
| 2016/0272314 A1* | 9/2016 | Radu | B64C 37/00 | |
| 2017/0313369 A1* | 11/2017 | Li | B62D 57/04 | |
| 2018/0050747 A1* | 2/2018 | Kazakov | B62D 55/075 | |

\* cited by examiner

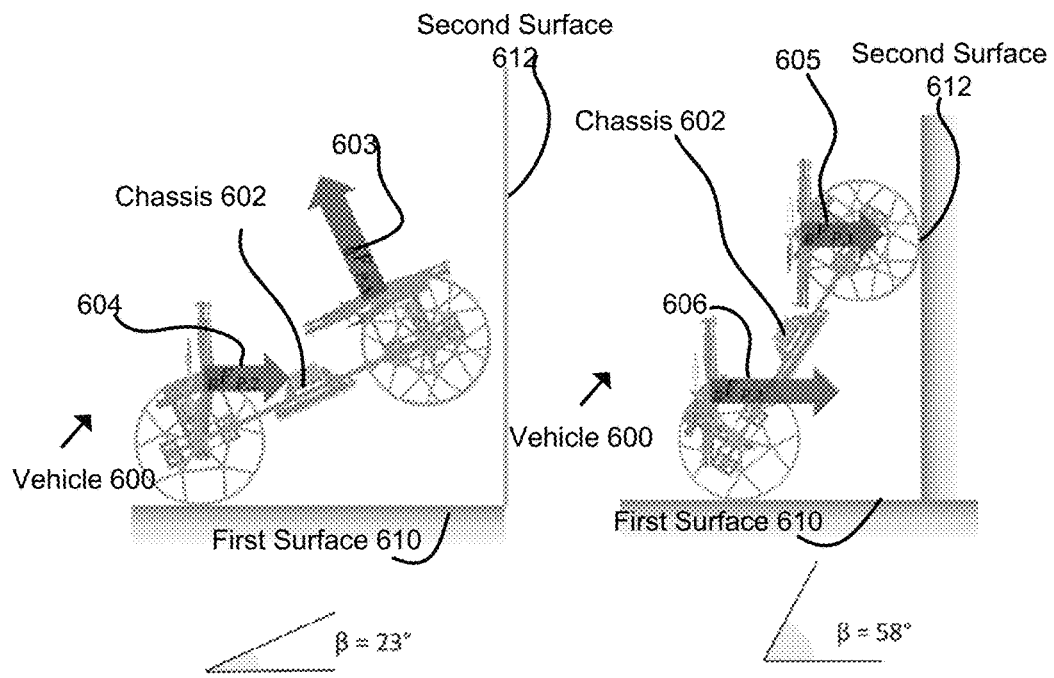
FIG. 6A
FIG. 6B
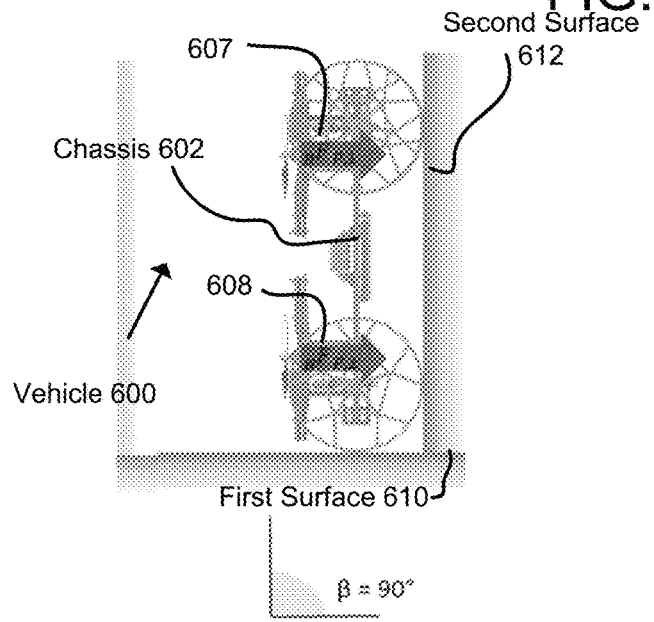
FIG. 6C

VEHICLES CONFIGURED FOR NAVIGATING SURFACE TRANSITIONS

FIELD

The disclosure relates to vehicles configured for navigating surface transitions.

BACKGROUND

Technology exists for allowing a vehicle climb a wall including magnetic force field, static electricity, and suction technology.

SUMMARY

The disclosure relates to a vehicle configured for navigating surface transitions. The vehicle may include a chassis, and/or other components. The chassis may include one or more of a first end, a second end, and/or other components.

The chassis may house one or more of one or more sensors, one or more motors, a controller, a power supply, a controller subsystem, one or more physical processors, an electronic storage, a remote controller and/or other components.

A first drive component may be connected to the chassis via a first carrier component and/or other components. A second drive component may be connected to the chassis via a second carrier component, and/or other components.

A first set of support components may be configured to be at or near the first end of the chassis. A second set of support components may be configured to be at or near the second end of the chassis. The first set of support components and the second set of set of support components may be configured to carry the vehicle by creating contact between the vehicle and a surface on which the vehicle is navigating on. By way of non-limiting illustration, the first set of support and/or the second set of support components may comprise one or more of wheels, skids, sleds, skis, tracks, and/or other devices.

The first set of support components and second set of set of support components may be configured to include individual support components. Individual support components may comprise a steering assembly. Support components may be configured as not actuatable (i.e. not providing the driving force).

The chassis may be configured to include one or more sensors and/or other components. Individual sensor(s) may include one or more of gravitational sensors, visual sensors, audio sensors, proximity sensors, environmental sensors, terrain sensors, orientation sensors, and/or other sensors.

Proximity to an object within an area surrounding vehicle may be measured at the first end of the chassis and/or other ends or sides of the chassis. Proximity to an object may be measured using infrared signal technology and/or other techniques. One or more of proximity sensor(s) may be configured to generate an output signal conveying distance from the chassis to one or more objects detected in the vicinity of the vehicle.

A controller subsystem may be configured to provide navigation control for the vehicle and/or other control features. The controller subsystem may be based on vehicle control information and/or other information. Vehicle control information may be based on information and/or parameters determined and/or obtained to control the vehicle.

The chassis may include one or more motors, and/or other components. Individual ones of motor(s) may be configured to generate needed forces for operating the vehicle. In some implementations, one or more of motor(s) may include independent servomotors configured to steer the first set of support components. In some implementations, one or more of motor(s) may include independent servomotors configured to steer the second set of support components. In some implementations, one or more of motor(s) may be configured to drive the first drive component. In some implementations, one or more of motor(s) may be configured to drive and the second drive component.

The chassis may be configured to include a power supply and/or other components. The power supply may be configured to power motor(s) and/or other components of the vehicle.

Support components may be configured to create traction between vehicle and a surface on which vehicle is navigating upon. The traction may be accomplished via rotation of individual support components and/or other techniques for traction (e.g., sleds that slide).

The first drive component may comprise one or more of a propeller, a propeller motor, a drive motor, and/or other components. The propeller motor may be configured to facilitate rotation of the propeller. The drive motor may be configured to actuate rotation and/or tilt of the first carrier component in relation to the chassis. The second drive component may comprise one or more of a propeller, a propeller motor to actuate the rotation of a propeller, a drive motor, and/or other components. The first carrier component may be configured to have one or more degrees of freedom of movement. By way of non-limiting example, the first carrier component may be configured to have one to three degrees of freedom of movement. In some implementations, the first carrier component may be configured to have two degrees of freedom of movement. The second carrier component may be configured to have one or more degrees of freedom of movement. By way of non-limiting example, the second carrier component may be configured to have one to three degrees of freedom of movement. In some implementations, the second carrier component may be configured to have two degrees of freedom of movement.

The rotational tilting of the first carrier component may be configured to change a direction of a force generated by the first drive component to facilitate actuating support components of the vehicle. The rotational tilting of the second carrier component may be configured to change the direction of the force generated by the second drive component to facilitate actuating support components of vehicle.

An orbital support component may be configured to connect the drive component including a propeller, a propeller motor, a drive motor, and/or other components. A drive motor of the drive component may be configured to rotationally tilt the orbital support component such that vehicle may be propelled forward.

The vehicle may include a controller configured to control one or more of the first set of support components, the second set of support components, the first drive component, the second drive component, the first carrier component, the second carrier component and/or other components. Control facilitated by the controller may be based on sensor output from individual sensors, and/or other information. The sensors may include one or more of the proximity sensors, one or more of the orientation sensors, the gravitational sensor, and/or other sensors.

The controller subsystem may be configured to control a vehicle navigating surface transitions, in accordance with one or more implementations. The controller subsystem may include one or more controllers. The controller subsystem may include one or more physical processors, and/or other components. The controller subsystem may be configured to execute one or more computer program components. The computer program components may include one or more of a proximity component, an orientation component, a gravitational component, and/or other components.

The proximity component may be configured to determine whether the first set of support components has made contact with an object based on output signals from one or more sensors. One or more sensors may be configured as one or more proximity sensors conveying a distance from the vehicle to one or more objects detected in the vicinity of the vehicle.

The orientation component may be configured to determine an angle between the chassis and a surface on which the vehicle is navigating on based on output signals from one or more sensors. One or more sensors may be configured as one or more orientation sensors conveying a turning rate of the second set of support components. The orientation component may be configured to determine an angle between the chassis and the surface in contact with the first individual support component of the second set of support components. The orientation component may be configured to determine an angle between the chassis and the surface in contact with the second individual support component of the second set of support components.

The orientation component may be configured to control the first drive component to generate a first thrust force. The orientation component may be configured to control the second drive component to generate a second thrust force. The orientation component may be configured to adjust an orientation of the first carrier component to control a direction of the first thrust force generated by the first drive component. The orientation component may be configured to adjust an orientation of the second carrier component to control a direction of the second thrust force generated by the first drive component.

The gravitational component may be configured to determine a gravitational pull during vehicle navigation of surface transitions based on output signals from one or more sensors. One or more sensors may be configured as a gravitational sensor conveying a direction of gravitational forces upon the vehicle.

The remote controller may be configured to transmit information, including but not limited to vehicle control information and/or other information.

The controller may be configured to determine and/or receive vehicle control information, sensor control information, and/or other information.

These and other objects, features, and characteristics of the apparatus and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 6A illustrates a vehicle configured for advanced navigation of surface transitions by determining whether distance between vehicle and a first surface exists, in accordance with one or more implementations.

FIG. 6B illustrates a vehicle configured for advanced navigation of surface transitions by controlling thrust generated by the drive components, in accordance with one or more implementations.

FIG. 6C illustrates a vehicle configured for advanced navigation of surface transitions by navigating on a second surface, in accordance with one or more implementations.

DETAILED DESCRIPTION

Figure 1:
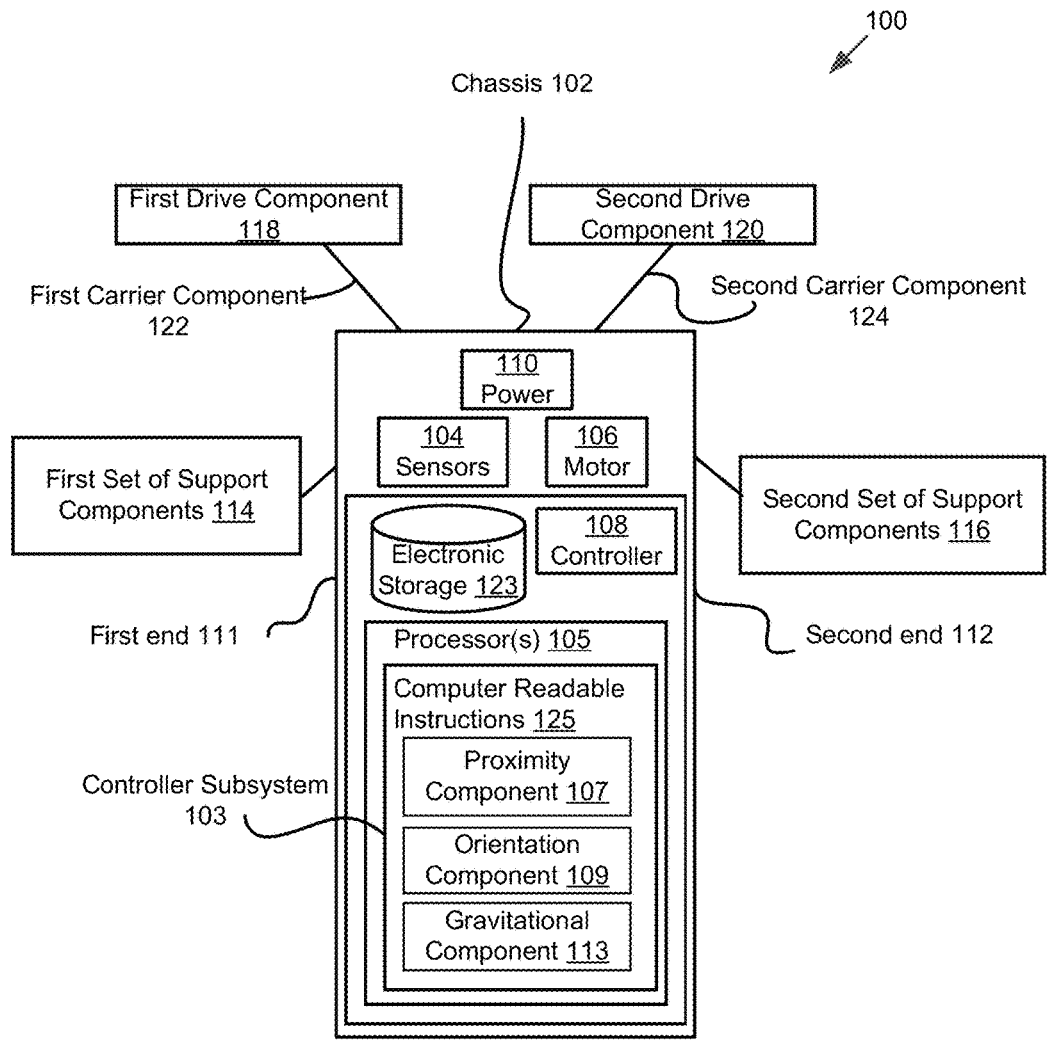
FIG. 1 illustrates a schematic representation of a vehicle configured for navigating surface transitions, in accordance with one or more implementations.

FIG. 1 illustrates schematic representation of a vehicle configured for navigating surface transitions. As is illustrated in FIG. 1, vehicle 100 may include one or more of chassis 102, and/or other components. Chassis 102 may be configured to have one or more of first end 111, second end 112, and/or other features.

Chassis 102 may house one or more of one or more sensors 104, one or more motors 106, controller 108, power supply 110, controller subsystem 103, one or more physical processors 105, electronic storage 123, remote controller (not shown in FIG. 1) and/or other components.

First drive component 118 may be connected to chassis 102 via first carrier component 122 and/or other components. Second drive component 120 may be connected to chassis 102 via second carrier component 124, and/or other components.

First set of support components 114 may be configured to be at or near first end 111 of chassis 102. Second set of support components 116 may be configured to be at or near second end 112 of chassis 102. First set of support components 114 and second set of set of support components 116 may be configured to carry vehicle 100 by creating contact between vehicle 100 and a surface on which vehicle 100 is navigating on.

First set of support components 114 and second set of set of support components 116 may be configured to include individual support components. Individual support components may comprise a steering assembly. In some implementations, the steering assembly of the individual support components may comprise a wheel connected to an axel, a steering shaft, and/or other assemblies. The steering assembly including the wheel connected to an axel may be configured to permit rotary movement by generating traction between vehicle 100 and surface on which vehicle 100 is navigating on. Other assemblies may include one or more of skis, sleds, skids, tracks, and/or other devices.

In some implementations, steering assemblies may include track assemblies, ski assemblies, and/or other steering assemblies. A track assembly may include continuous toothed drive belts and/or cleated half-tracks mounted on a drive cog connected to an axle of vehicle 100. The track assembly may be configured to convert rotational motion to linear motion to by generating frictional contact with the surface on which vehicle 100 is navigating on. A ski assembly may include one or more of snowmobile style skis mounted onto chassis 102. The ski assembly may be configured to convert rotational motion to linear motion to by generating frictional contact with the surface on which vehicle 100 is navigating on.

Support components may be configured as not actuatable (i.e. not providing the driving force). For example, the driving force may be generated by driving components and/or other components of vehicle 100.

Chassis 102 may be configured to include one or more sensors 104 and/or other components. Individual ones of sensors 104 may include one or more of gravitational sensors, visual sensors, audio sensors, proximity sensors, environmental sensors, terrain sensors, orientation sensors, and/or other sensors. In some implementations, one or more of sensor(s) 104 may be positionable and/or attached to chassis 102 in a manner that facilitates sensor(s) 104 being moved. In some implementations, chassis 102 may house one or more of cameras, RF surveillance equipment, and/or other recording transmission electronics that may be configured to convey and/or transmit information around vehicle 100.

In some implementations, various parameters such as gravity, velocity, proximity to an object, wheel speed and steering angle may be measured during vehicle 100 operation. Gravitational vector may be measured at the center of vehicle 100. Gravitational vector may be measured via one or more of an accelerometer, gyroscope, and/or other devices.

In some implementations, a turning rate of second set of support components 116 may be measured at the center of each axle of the steering assembly of the individual support components of second set of support components 116. The turning rate of the steering assembly of the individual support components of second set of support components 116 may be used to determine orientation, pitch, and speed of vehicle 100.

In some implementations, the turning rate may be measured using magnetic encoders placed at the center of each axle of the steering assembly of the individual support components of second set of support components 116. In some implementations, the speed of vehicle 100 may be measured with encoders mounted on the steering shaft of the steering assembly of the individual support components of second set of support components 116.

In some implementations, a steering angle may be measured with an encoder mounted on the steering shaft of the steering assembly of the individual support components of second set of support components 116. Steering angles may be calculated from the steering assembly position of the individual support components of second set of support components 116 and known steering geometry.

Proximity to an object within an area surrounding vehicle 100 may be measured at first end 111 of chassis 102 and/or other ends or sides of chassis. Proximity to an object may be measured using infrared signal technology and/or other techniques. One or more of proximity sensors may be configured to generate an output signal conveying distance from chassis 102 to one or more objects detected in the vicinity of vehicle 100.

Controller subsystem 103 may be configured to provide navigation control for vehicle 100 and/or other control features. Controller subsystem 103 may be based on vehicle control information and/or other information. Vehicle control information may be based on information and/or parameters determined and/or obtained to control vehicle 100. In some implementations, providing navigation control may include functions including, but not limited to, moving vehicle 100 on a horizontal surface, detecting objects around vehicle 100, determining that a surface, perpendicular to the surface of navigation is reached, transitioning from one surface onto another, and/or other functions configured to facilitate navigation of vehicle 100.

Chassis 102 may include one or more motors 106, and/or other components. Individual ones of motor(s) 106 may be configured to generate needed forces for operating vehicle 100. In some implementations, one or more of motor(s) 106 may include independent servomotors configured to steer first set of support components 114. In some implementations, one or more of motor(s) 106 may include independent servomotors configured to steer second set of support components 116. In some implementations, one or more of motor(s) 106 may be configured to drive first drive component 118. In some implementations, one or more of motor(s) 106 may be configured to drive and second drive component 120.

Chassis 102 may be configured to include power supply 110. Power supply 110 may be configured to power motor(s) 106 and/or other components of vehicle 100.

Figure 2:
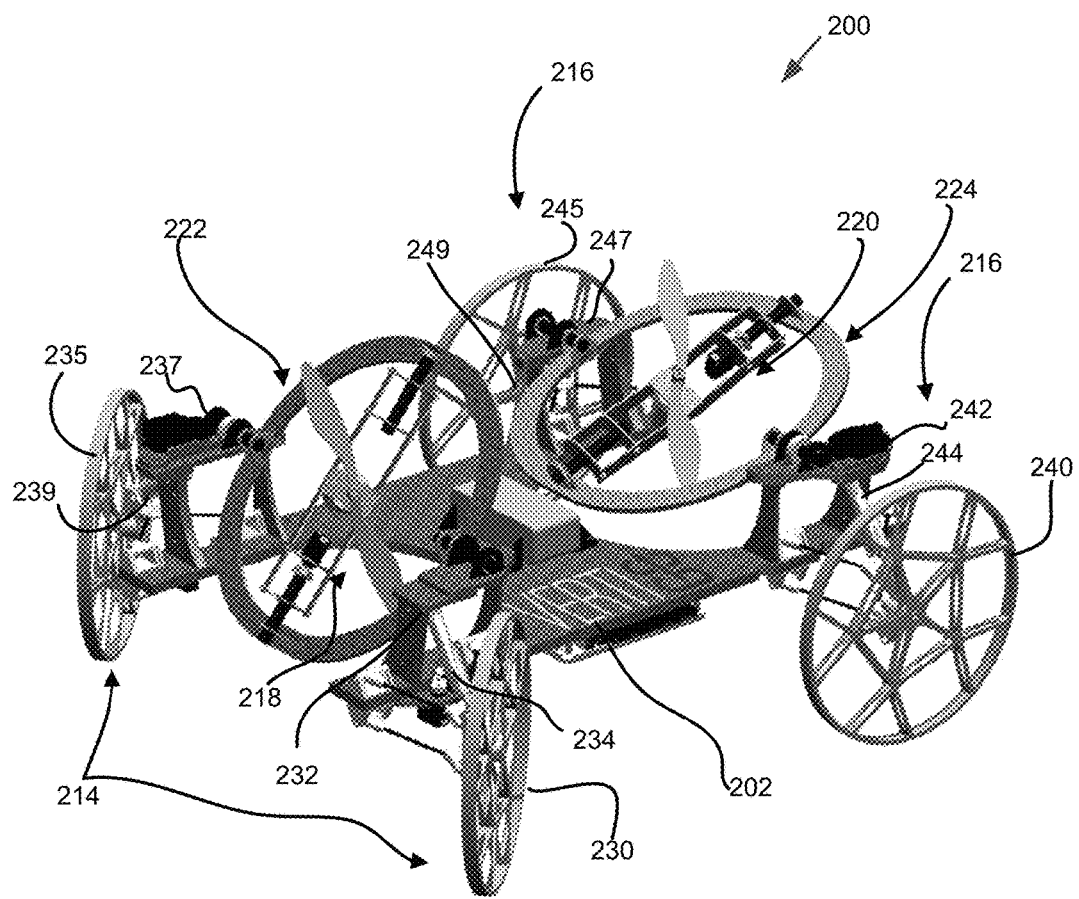
FIG. 2 illustrates a side view of an exemplary vehicle configured for navigating surface transitions, in accordance with one or more implementations.

As illustrated in FIG. 2, vehicle 200 configured for navigating surface transitions may comprise one or more of first set of support components 214, second set of support components 216, and/or other components in accordance with an implementation. First set of support components 214 may further comprise individual support components 230 and 235 and/or other components. Support component 230 may be mounted onto chassis 202 via strut 234 and/or other components connected to chassis mount 232. Support component 235 may be mounted onto chassis 202 via strut 239 and/or other components connected to chassis mount 237. Second set of support components 216 may further comprise individual support components 240 and 245 and/or other components. Support component 240 may be mounted onto chassis 202 via strut 244 and/or other components connected to chassis mount 242. Support component 245 may be mounted onto chassis 202 via strut 249 and/or other components connected to chassis mount 247.

Support components 230, 235, 240, 245 may be configured to create traction between vehicle 200 and a surface on which vehicle 200 is navigating upon. In some implementations, support components 230, 235, 240, 245 may comprise wheels such that traction may be accomplished via rotation of individual support components 230, 235, 240, 245.

In some implementations, first set of support components 214 and second set of support component 216 of vehicle 200 may be configured to be controlled jointly. In some implementations, first set of support components 214 and second set of support component 216 of vehicle 200 may be configured to be controlled independently of one another. By way of non-limiting example, first set of support components 214 may be configured to have steering capabilities whereas second set of support component 216 may not have steering capabilities.

In some implementations, forces needed to actuate support components of vehicle 200 may be generated by one or more of first drive component 218 connected to chassis 202 via first carrier component 222, second drive component 220 connected to chassis 202 via second carrier component 224, and/or other components connected to other parts of chassis 202. Details of first drive component 218 and/or first carrier component 222 are describe with respect to FIG. 3 (noting that second drive component 220 and/or second carrier component 224 may be similarly configured).

First carrier component 222 may be configured to have one or more degrees of freedom of movement. By way of non-limiting example, first carrier component 222 may be configured to have one to three degrees of freedom. In some implementations, first carrier component 222 may be configured to have two degrees of freedom of movement. Second carrier component 224 may be configured to have one or more degrees of freedom of movement. By way of non-limiting example, second carrier component 224 may be configured to have one to three degrees of freedom. In some implementations, second carrier component 224 may be configured to have two degrees of freedom.

The rotational tilting of the first carrier component 222 may be configured to change a direction of a force generated by first drive component 218 to facilitate actuating support components of vehicle 202. The rotational tilting of second carrier component 224 may be configured to change the direction of the force generated by second drive component 220 to facilitate actuating support components of vehicle 202.

In some implementations, first carrier component 222 and second carrier component 224 of vehicle 200 may be configured to be controlled jointly. In some implementations, first carrier component 222 and second carrier component 224 of vehicle 200 may be configured to be controlled independently of one another.

Figure 3:
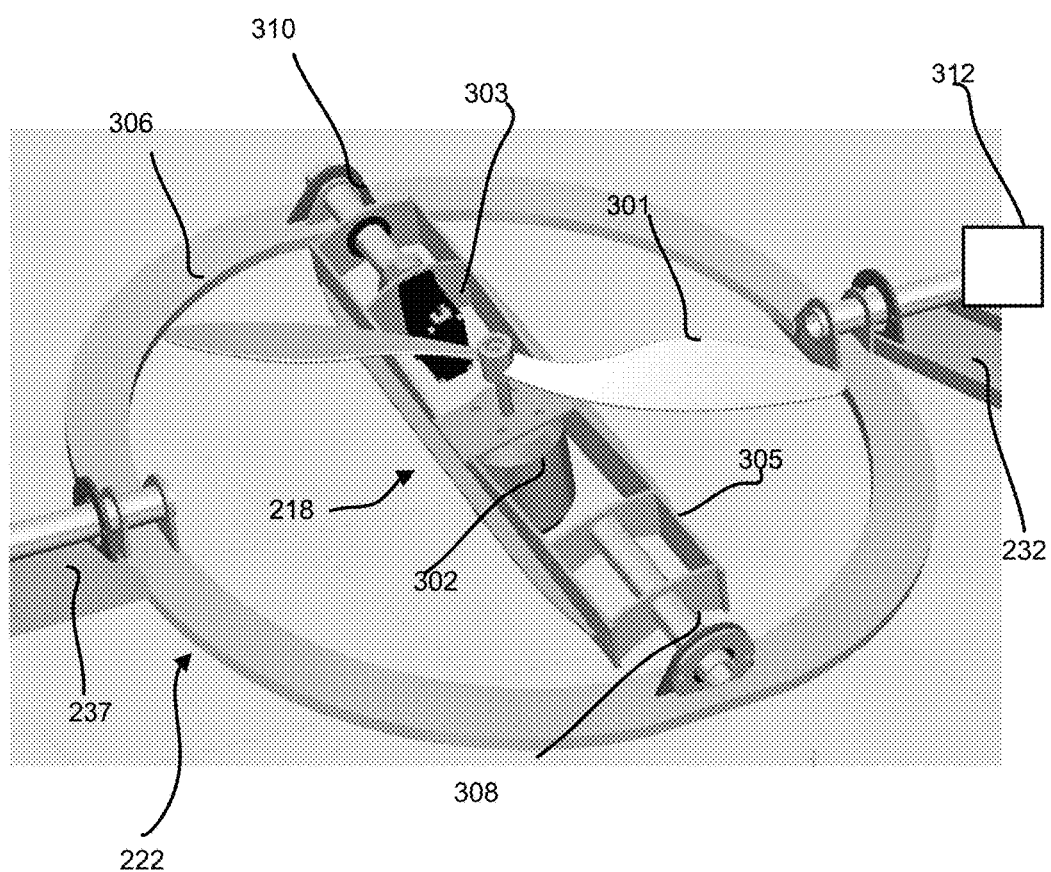
FIG. 3 illustrates a top view of a carrier connecting a drive component of the vehicle, in accordance with one or more implementations.

As illustrated in FIG. 3, a detailed view of first drive component 218 and first carrier component 222 is shown. In some implementations, first drive component 218 may include one or more of propeller 301, propeller motor 302, and/or other components. In some implementations, first carrier component 222 may include one or more of orbital support component 306, propeller support 305, and/or other components.

Propeller support 305 may be configured to mount first drive component 218 to orbital support component 306. Propeller support 305 may mount first drive component 218 to orbital support component 306 via one or more of first propeller mount 308, second propeller mount 310, and/or other components. In some implementations, first propeller mount 308 and/or second propeller mount 310 may be configured to rotationally couple propeller support 305 to orbital support component 306. The coupling between propeller support 305 and the orbital support component 306 may be configured to facilitate rotation of the orbital support component 306 about a first axis of rotation. First propeller mount 308 and/or second propeller mount 310 may include one or more of flexible coupling, beam coupling, gear coupling, bearings, and/or other type of coupling. Without limiting the forgoing, first propeller mount 308 and second propeller mount 310 may be configured to couple a variety of drive components shapes and sizes.

Orbital support component 306 may be coupled to the chassis (not shown in FIG. 3) via chassis mount 232 on one side of orbital support component 306 and chassis mount 237 on an opposite side of orbital support component 306. Chassis mount 232 and/or chassis mount 237 may be configured to rotationally couple orbital support component 306 to chassis. The coupling between chassis mounts 232, 237 and the orbital support component 306 may be configured to facilitate rotation of the orbital support component 306 about an axis of rotation perpendicular to the first axis of rotation. Chassis mount 232 and/or chassis mount 237 may include one or more of flexible coupling, beam coupling, gear coupling, bearings, and/or other type of coupling. Without limiting the forgoing, chassis mount 232 and/or chassis mount 237 may be configured to couple a variety of drive component shapes and sizes.

Drive motor 303 may be configured to effectuate rotational tilting of propeller support 305 with respect to orbital support component 306. Drive motor 312 may be configured to effectuate rotational tilting of orbital support component 306 with respect to chassis (not shown in FIG. 3).

Propeller 301 may be configured to include one or more rotor blades, and/or other components. The quantity of the rotor blades is not intended to be limited by any depiction. The propeller 301 may be powered by propeller motor 302 to generate rotational force of the propeller 301 such that vehicle may be propelled in a direction dictated by rotational positioning of one or both of orbital support component 306 and/or propeller support 305.

It is noted that second drive component 220 and/or second carrier component 224 of FIG. 2 may be similarly configured as first drive component 218 and first carrier component 222 as shown in FIG. 3.

Referring back to FIG. 1, vehicle 100 may include controller 108. Controller 108 may be configured to control one or more of first set of support components 114, second set of support components 116, first drive component 118, second drive component 120, first carrier component 122, second carrier component 124 and/or other components. Control facilitated by controller 108 may be based on sensor output from individual sensors. The sensors may include one or more of the proximity sensors, one or more of orientation sensors, the gravitational sensor, and/or other sensors.

Figure 4:
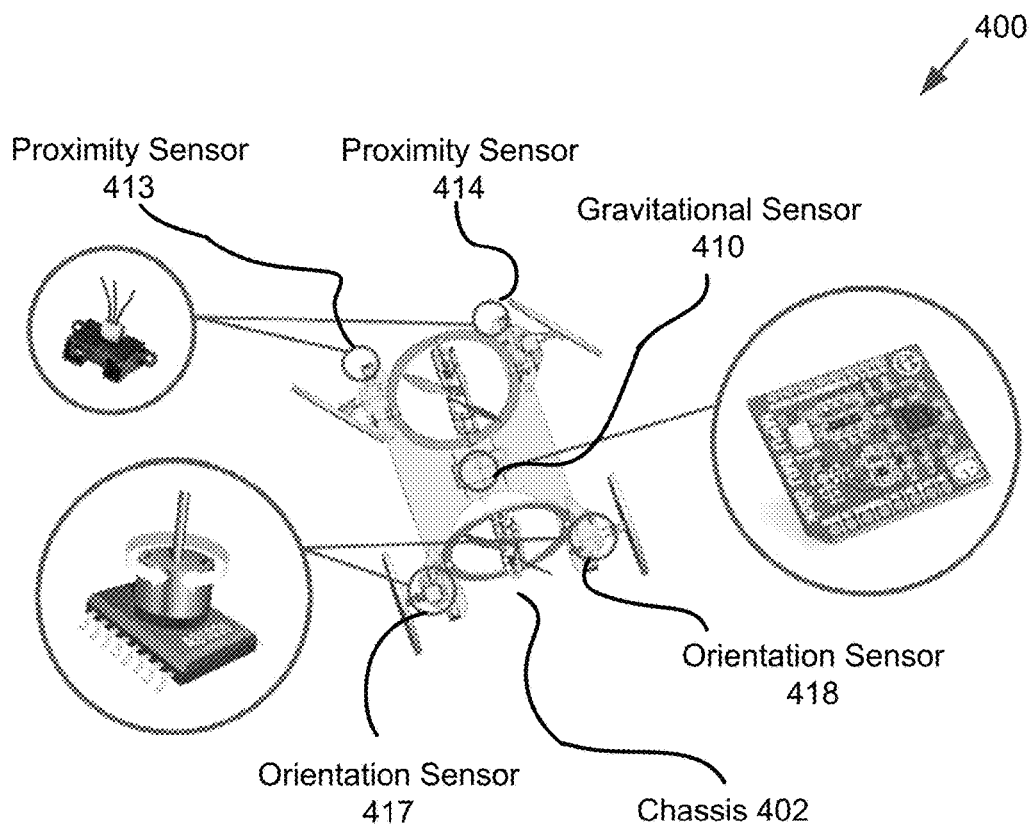
FIG. 4 illustrates a top view of an exemplary vehicle configured for navigating surface transitions, in accordance with one or more implementations.

As illustrated in FIG. 4, sensors of vehicle 400 may include one or more of gravitational sensor 410, proximity sensor 413, proximity sensor 414, orientation sensor 417, orientation sensor 418, and/or other sensors.

Gravitational sensor 410 may be configured to be positioned within chassis 402 of vehicle 400. Gravitational sensor 410 may be configured to generate an output signal conveying a direction of gravitational forces upon vehicle 400. Gravitational sensor 410 may be configured as an internal measurement unit including a 3-axis accelerometer and a 3-axis gyroscope. An output signal of gravitational sensor 410 may be used to determine position of vehicle 400 with respect to the ground.

Proximity sensor 413 may be positioned on first end of chassis 402 of vehicle 400 and/or at other locations. Proximity sensor 414 may be positioned on first end of chassis 402 of vehicle 400 and/or at other locations. Proximity sensor 413 and/or proximity sensor 414 may be configured to generate output signals conveying a distance from chassis 402 to one or more objects detected in the vicinity of vehicle 400. Proximity sensors 413 and 414 may be configured to use infrared technology and/or other technology. In some implementations, proximity sensor 413 and/or 414 may be configured to generate an analog signal representing a distance to an object in vehicle 400 vicinity. An analog signal output voltage may be converted to a distance to an object. For example, proximity sensor(s) 263 may be configured to detect objects ranging in distance from 0.15 m to 1.5 m, and/or other distance ranges.

In some implementations, orientation sensor 417 may be positioned on the second set of support components and/or other locations. Orientation sensor 418 may be positioned on the second set of support components, and/or other locations. Orientation sensors 417 may be positioned by a first individual support component of the second set of support components. Orientation sensors 418 may be positioned by the second individual support component of the second set of support components. Orientation sensor 417 and orientation sensor 418 may be configured as magnetic encoders and/or other types of sensors configured to generate output signals conveying orientation of individual support components. The first individual support component and the second individual support component of the second set of support components may be configured to have a magnet within individual axles of each individual support component of the second set of support components. Orientation sensor 417 may be configured to generate an output signal conveying a turning rate of the first individual component of the second set of support components. Orientation sensor 418 may be configured to generate an output signal conveying the turning rate of the second individual component of the second set of support components. For example, orientation sensor 417 may be configured to generate an output signal of 256 pulses per measured turn of the first individual component of the second set of support components and/or other information. Similarly, orientation sensor 418 may be configured to generate an output signal of 256 pulses per measured turn of the second individual component of the second set of support components, and/or other information.

Referring back to FIG. 1, controller subsystem 103, may be configured to control a vehicle navigating surface transitions, in accordance with one or more implementations. Controller subsystem 103 may include controller 108 and/or other components. Controller subsystem 103 may include one or more physical processors 105, and/or other components. Controller 108 may be configured to execute one or more computer program components. The computer program components may include one or more of proximity component 107, orientation component 109, gravitational component 113, and/or other components.

Proximity component 107 may be configured to determine whether first set of support components 114 has made contact with an object based on output signals from one or more sensors 104. One or more sensors 104 may be configured as one or more proximity sensors conveying distance from vehicle 100 to one or more objects detected in the vicinity of vehicle 100. For example, the object that may detected by proximity component 107 may be a rock, a park bench, a wall, and/or other object. By way of non-limiting example, proximity component 107 may be configured to determine and/or recognize the distance from vehicle 100 to an object, steer the vehicle in the direction of that object, determine that vehicle 100 is positioned in front of that object, and/or make other determinations based on a sensor output.

In some implementations, proximity component 107 may include a steering controller which may control steering of vehicle 100 in a direction of an object. Proximity component 107 may be configured to steer vehicle 100 if the output signal from the first proximity sensor exceeds a first proximity sensor value and/or other value. By way of non-limiting example, the first proximity sensor value may be configured as first proximity sensor value of 4.5 V. For example, vehicle 100 may be steered toward a direction of an object if obtained output signal from a first of the proximity sensors exceeds 0.45 V and/or conveys other information.

Proximity controller 107 may be configured to include a proportional integral derivative controller (PID-controller). Proximity controller 107 may activate the PID-controller if obtained output signal from a second of the two proximity sensors exceeds a proximity sensor value. By way of non-limiting example, the proximity sensor value may be configured as a proximity sensor value of 0.45 V. Once activated, the PID-controller may obtain a voltage difference between the voltage output from the two proximity sensors. Proximity controller 107 may be configured to disengage the steering controller if the output signal from the two proximity sensors exceeds a threshold value and/or other value. By way of non-limiting example, the threshold value may be configured as a threshold value of 4.5 V. Once the steering controller is disengaged, proximity controller 107 may be configured to drive vehicle 100 directly in the direction of an object. Proximity controller 107 may be configured to determine that first set of support components 114 has made contact with the object based on sensor output, as described herein.

Orientation component 109 may be configured to determine an angle between chassis 102 and a surface on which vehicle 100 is navigating on based on output signals from one or more sensors 104. One or more sensors 104 may be configured as one or more orientation sensors conveying the turning rate of second set of support components 116. Orientation component 109 may be configured to determine an angle between chassis 102 and the surface in contact with the first individual support component of second set of support components 116. Orientation component 109 may be configured to determine an angle between chassis 102 and the surface in contact with the second individual support component of second set of support components 116.

Orientation component 109 may be configured to calculate the angle by determining a covered distance based on a turning rate of second set of support components 116 obtained from an output signal from one or more orientation sensors. It may be known how much distance may be needed to be covered to the second surface. The angle may be set to zero as soon as proximity component 107 determines that first set of support components 114 has made contact with an object (e.g. wall and/or other object).

Orientation component 109 may be configured to control first drive component 118 to generate a first thrust force. Orientation component 109 may be configured to control second drive component 120 to generate a second thrust force. Orientation component 109 may be configured to adjust the orientation of first carrier component 122 to control a direction of the first thrust force generated by first drive component 118. Orientation component 109 may be configured to adjust the orientation of the second carrier component 124 to control a direction of the second thrust force generated by second drive component 120.

Figure 5A:
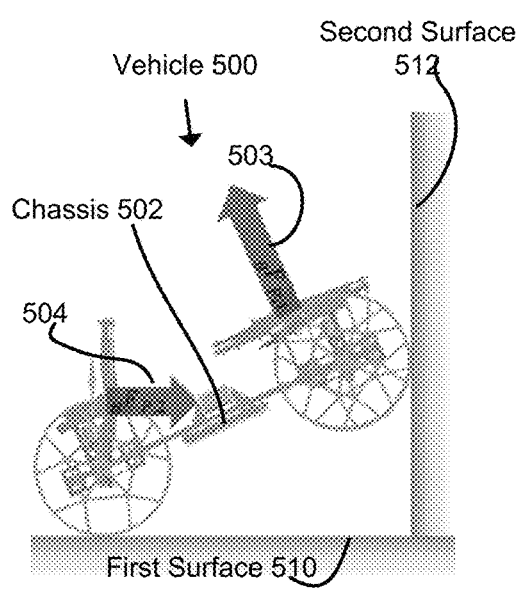
FIG. 5A illustrates a vehicle configured to navigate surface transitions functionally by determining whether contact between vehicle and a first surface is made, in accordance with one or more implementations.
Figure 5B:
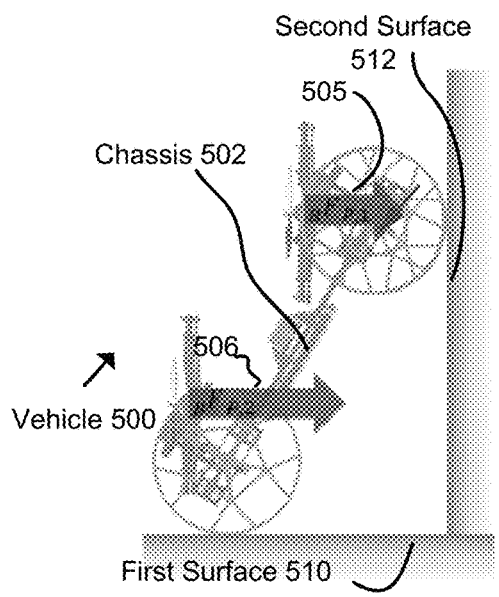
FIG. 5B illustrates a vehicle configured to navigate surface transitions functionally by controlling thrust generated by the drive components, in accordance with one or more implementations.
Figure 5C:
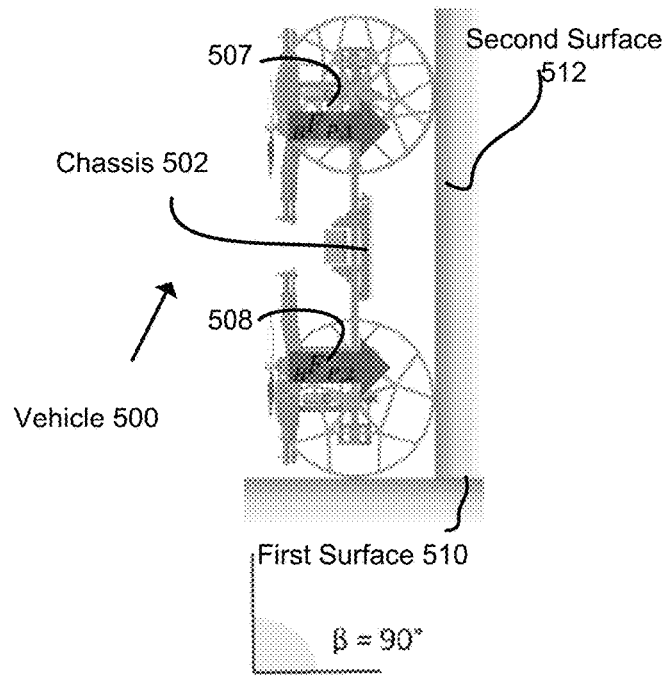
FIG. 5C illustrates a vehicle configured to navigate surface transitions functionally by navigating on a second surface, in accordance with one or more implementations.

By way of non-limiting example, FIGS. 5A-5C illustrate vehicle 500 transitioning from first surface 510 on which vehicle 500 is navigating on to second surface 512, where a first set of support components of vehicle 500 is in contact with second surface 512. In this case illustrated by FIGS. 5A-5C, first surface 510 may be configured as a horizontal surface (e.g. a floor) and second surface 512 may be configured as a vertical surface (e.g. a wall).

In FIG. 5A, proximity component 107 may be configured to determine that first set support components have contact with second surface 512. Orientation component 109 may be configured to determine that the angle between chassis 502 and first surface 510 is less than a first value. The first value may be 32° and/or other value. Orientation component 109 may be configured to facilitate one or more of controlling a first drive component to generate first thrust force 503, adjusting a first carrier component to direct first thrust force 503 perpendicular to chassis 502, controlling the second drive component to generate second thrust force 504, controlling the second carrier component to direct second thrust force 504 parallel to the chassis 502, and/or other operations. During this transition, first force 503 generated by the first drive component may facilitate lifting vehicle 500 in a direction of the thrust while second force 504 generated by the second drive component may drive vehicle 500 in a first direction so that the first set of support components may not lose contact with second surface 512.

In FIG. 5B, orientation component 109 may be configured to determine that the angle between chassis 502 and first surface 510 is greater than a first value but less than a second value. The first value may be 32° and/or other values. The second value may be 90° and/or other values. Orientation component 109 may be configured to facilitate one or more of controlling a first drive component to generate third thrust force 505, adjusting a first carrier component to direct third thrust force 505 parallel to chassis 502, controlling the second drive component to generate fourth thrust force 506, controlling the second carrier component to direct fourth thrust 506 force parallel to the chassis 502, and/or other operations. During this transition, third force 505 generated by the first drive component may be configured such that the first set of support components may be maintained in contact with second surface 512, while fourth force 506 generated by the second drive component may be increased to bring vehicle 500 parallel with second surface 512.

In FIG. 5C, orientation component 109 may be configured to determine that the angle between chassis 502 and first surface 510 is equal to the second value. Orientation component 109 may be configured to facilitate one or more of controlling a first drive component to generate fifth thrust 507 force, adjusting a first carrier component to direct fifth thrust force 507 parallel to chassis 502, controlling the second drive component to generate sixth thrust force 508, controlling the second carrier component to direct sixth thrust force 508 parallel to chassis 502. During this transition, fifth force 507 generated by the first drive component may be decreased and may be configured such that the first set of support components may be maintained in contact with second surface 512, while sixth force 508 generated by the second drive component may be decreased and may be configured such that the second set of support components may be maintained in contact with second surface 512.

In some implementations, vehicle 500 transitioning from first surface 510 on which vehicle 500 is navigating on to second surface 512, where a first set of support components of vehicle 600 is in contact with second surface 512, as illustrated by FIGS. FIGS. 5A-5C, may include a first surface that may be configured as a vertical surface (e.g. a wall) and a second surface that may configured as a vertical surface (e.g. a wall). In some implementations, the first surface may be configured as vertical surface (e.g. a wall) and the second surface may be configured as a horizontal surface (e.g. a floor). In some implementations, the first surface may be configured as vertical surface (e.g. a wall) and the second surface may be configured as a horizontal surface (e.g. a ceiling).

By way of non-limiting example, FIGS. 6A-6C illustrate vehicle 600 transitioning from first surface 610 on which vehicle 600 is navigating on to second surface 612, where a first set of support components of vehicle 600 is not in contact with second surface 612. In this case, illustrated by FIGS. 6A-6C, first surface 610 may be configured as a horizontal surface (e.g. a floor) and second surface 612 may be configured as a vertical surface (e.g. a wall).

In FIG. 6A, proximity component 107 may be configured to determine that first set support components does not have contact with second surface 612. Proximity component may be configured to determine a distance between vehicle 600 and second surface 612 is not greater than a first value. The first value may be 1.5 m and/or other value. Orientation component 109 may be configured to determine that the angle between chassis 602 and the first surface 610 is less than a second value. The second value may be 35° and/or other value. Orientation component 109 may be configured to facilitate one or more of controlling a first drive component to generate first thrust force 603, adjusting a first carrier component to direct first thrust force 603 perpendicular to chassis 602, controlling the second drive component to generate second thrust force 604, controlling the second carrier component to direct second thrust force 604 parallel to the chassis 602, and/or other operations. During this transition, first force 603 generated by the first drive component may facilitate lifting vehicle 600 in a direction of the thrust until the angle between chassis 602 and the first surface 610 reaches the second value, while second force 604 generated by the second drive component may drive vehicle 600 in a first direction so that the first set of support components may make contact with second surface 612.

In FIG. 6B, orientation component 109 may be configured to determine that the angle between chassis 602 and first surface 610 is greater than a third value but less than a fourth value. The third value may be 50° and/or other values. The fourth value may be 90° and/or other values. Orientation component 109 may be configured to facilitate one or more of controlling a first drive component to generate third thrust force 605, adjusting a first carrier component to direct third thrust force 605 parallel to chassis 602, controlling the second drive component to generate fourth thrust force 606, controlling the second carrier component to direct fourth thrust 606 force parallel to the chassis 602, and/or other operations. During this transition, third force 605 generated by the first drive component may be configured such that the first set of support components may be maintained in contact with second surface 612, while fourth force 606 generated by the second drive component may be increased to bring vehicle 600 parallel with second surface 612.

In FIG. 6C, orientation component 109 may be configured to determine that the angle between chassis 602 and first surface 610 is equal to the fourth value. Orientation component 109 may be configured to facilitate one or more of controlling a first drive component to generate fifth thrust force 607, adjusting a first carrier component to direct fifth thrust force 607 parallel to chassis 602, controlling the second drive component to generate sixth thrust force 608, controlling the second carrier component to direct sixth thrust force 608 parallel to chassis 602. During this transition, fifth force 607 generated by the first drive component may be decreased and may be configured such that the first set of support components may be maintained in contact with second surface 612, while sixth force 608 generated by the second drive component may be decreased and may be configured such that the second set of support components may be maintained in contact with second surface 612.

In some implementations, vehicle 600 transitioning from first surface 610 on which vehicle 600 is navigating on to second surface 612, where a first set of support components of vehicle 600 is not in contact with second surface 612, as illustrated by FIGS. 6A-6C, may include a first surface that may be configured as a vertical surface (e.g. a wall) and a second surface that may configured as a vertical surface (e.g. a wall). In some implementations, the first surface may be configured as vertical surface (e.g. a wall) and the second surface may be configured as a horizontal surface (e.g. a floor). In some implementations, the first surface may be configured as vertical surface (e.g. a wall) and the second surface may be configured as a horizontal surface (e.g. a ceiling).

Referring back to FIG. 1, gravitational component 113 may be configured to determine the gravitational pull during vehicle 100 navigating surface transitions based on output signals from one or more sensors 104. One or more sensor 104 may be configured as the gravitational sensor conveying a direction of gravitational forces upon vehicle 100. By way of non-limiting example, gravitational component 113 may be configured to determine that vehicle 100 is navigating down on a vertical surface, such as a wall, and determine the force that needs to be applied to control vehicle 100 speed on its descent to account for gravitational pull and/or to prevent a collision between vehicle 100 and a surface onto which vehicle 100 is transitioning to, such as a floor. By way of non-limiting example, gravitational component 113 may be configured to determine that vehicle 100 is navigating on a horizontal surface, such as a ceiling, and determine the force that needs to be applied to account for gravitational pull such that that first set of support components 114 and second set of support components 116 maintain contact with the horizontal surface and/or other surfaces.

Remote controller may be configured to transmit information, including but not limited to vehicle control information and/or other information. In some implementations, remote controller may be a separate, distinct, and/or physically independent component of vehicle 100. In some implementations, remote controller may be configured to be supported, worn, held, and/or carried by a user. In some implementations, remote controller may include a user interface configured to receive user input. The user input may include vehicle control information, and/or other information.

Controller 108 may be configured to determine and/or receive vehicle control information, sensor control information, and/or other information. For example, controller 108 may be configured to receive vehicle control information remote controller. In some implementations, the controller interface may be included, combined, embedded, and/or otherwise form an integral part of vehicle 100.

One or more processor(s) 105 may be configured to provide information processing capabilities in controller subsystem 103. As such, processor(s) 105 may include one or more of a digital processor, an analog processor, a digital circuit designed to process information, an analog circuit designed to process information, a state machine, and/or other mechanisms for electronically processing information. Although processor(s) 105 is shown in FIG. 1 as a single entity, this is for illustrative purposes only. In some implementations, processor(s) 105 may include a plurality of processing units. These processing units may be physically located within the same device, or processor(s) 105 may represent processing functionality of a plurality of devices operating in coordination. The processor(s) 105 may be configured to execute computer readable instruction components 107, 109, 113, and/or other components. The processor(s) 105 may be configured to execute components 107, 109, 113, and/or other components by software; hardware; firmware; some combination of software, hardware, and/or firmware; and/or other mechanisms for configuring processing capabilities on processor(s) 105.

One or more physical processors 105 may be configured via computer-readable instructions 125 to provide information-processing capabilities and/or execute computer program components. The computer program components may include one or more of one or more of proximity component 107, orientation component 109, gravitational component 113, and/or other components. The number of physical processors 105 is not intended to be limited in any way by the depiction in FIG. 1.

It should be appreciated that although components 107, 109, and 113 are illustrated in FIG. 1 as being located and/or co-located within a particular component of vehicle 100, in implementations in which physical processor 105 includes multiple processing units, one or more of components 107, 109, and 113 may be located remotely from the other components. The description of the functionality provided by the different components 107, 109, and 113 described herein is for illustrative purposes, and is not intended to be limiting, as any of components 107, 109, and 113 may provide more or less functionality than is described. For example, one or more of components 107, 109, and 113 may be eliminated, and some or all of its functionality may be incorporated, shared, integrated into, and/or otherwise provided by other ones of components 107, 109, and 113. Note that physical processor 105 may be configured to execute one or more additional components that may perform some or all of the functionality attributed below to one of components 107, 109, and 113.

Electronic storage 123 comprises electronic storage media that electronically stores information. The electronic storage media of electronic storage 123 may include one or both of system storage that is provided integrally (i.e., substantially non-removable) with vehicle 100 and/or removable storage that is connectable to vehicle 100 via, for example, a port (e.g., a USB port, a Firewire port, etc.) or a drive (e.g., a disk drive, etc.). Electronic storage 123 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 123 may store software algorithms, information determined by physical processor(s) 105, information determined by components, and/or other information that enables vehicle 100 to function properly. For example, electronic storage 123 may store vehicle control information (as discussed elsewhere herein), and/or other information. Electronic storage 123 may be a separate component within vehicle 100, or electronic storage 123 may be provided integrally with one or more other components of vehicle 100 (e.g., physical processor 105).

Figure 7:
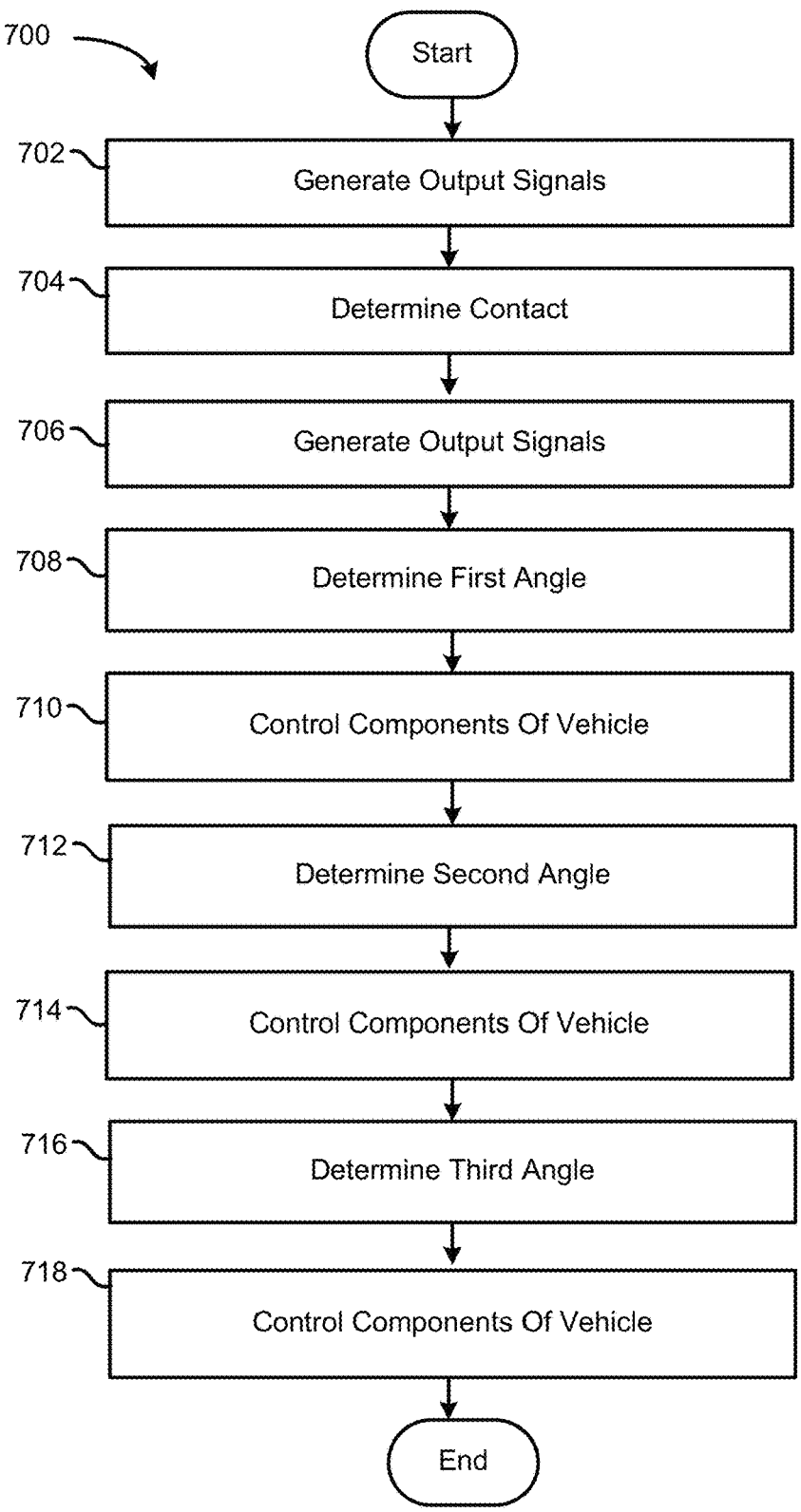
FIG. 7 illustrates a method for navigating surface transitions, in accordance with one or more implementations.

FIG. 7 illustrates a method 700 for controlling a vehicle configured for navigating surface transitions. The operations of method 700 presented below are intended to be illustrative. In certain implementations, method 700 may be accomplished with one or more additional operations not described, and/or without one or more of the operations discussed. Additionally, the order in which the operations of method 700 are illustrated in FIG. 7 and described below is not intended to be limiting.

In certain implementations, method 700 may be implemented in one or more processing devices (e.g., a digital processor, an analog processor, a digital circuit designed to process information, an analog circuit designed to process information, and/or other mechanisms for electronically processing information), one or more vehicles, and/or other components. The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At an operation 702, output signals may be generated that convey proximity between a vehicle and a second surface and/or other information. Operation 702 may be performed by a sensor that is the same as or similar to sensors 413 and/or 414 (shown in FIG. 4 and described herein), in accordance with one or more implementations.

At an operation 704, determination of whether a first set of support components has contact with the second surface may be made. Operation 504 is performed by one or more physical processors executing a proximity component that is the same as or similar to proximity component 107 (shown in FIG. 1 and described herein), in accordance with one or more implementations.

At an operation 706, output signals that convey a turning rate of a second set of support components and/or other information may be generated. Operation 706 may be performed by a sensor that is the same as or similar to sensors 417 and/or 418 (shown in FIG. 4 and described herein), in accordance with one or more implementations.

At an operation 708, a first angle between the vehicle and a first surface and/or other surfaces may be determined. Operation 708 may be performed by one or more physical processors executing an orientation component that is the same as or similar to orientation component 109 (shown in FIG. 1 and described herein), in accordance with one or more implementations.

At an operation 710, one or more components of the vehicle may be controlled. This may include one or more of that a first drive component may be controlled to generate a first thrust force, a first carrier component may be adjusted to direct the first thrust force perpendicular to the vehicle, a second drive control component may be controlled to generate a second thrust force, and/or a second carrier component may be controlled to direct the second thrust force parallel to the vehicle. Operation 710 may be performed by one or more physical processors executing an orientation component that is the same as or similar to orientation component 109 (shown in FIG. 1 and described herein), in accordance with one or more implementations.

At an operation 712, a second angle between the vehicle and the first surface and/or other surfaces may be determined. Operation 712 may be performed by one or more physical processors executing an orientation component that is the same as or similar to orientation component 109 (shown in FIG. 1 and described herein), in accordance with one or more implementations.

At an operation 714, one or more components of vehicle may be controlled. This may include that the first drive component may be controlled to generate a third thrust force, the first carrier component may be adjusted to direct the third thrust force parallel to the vehicle, the second drive control component may be controlled to generate a fourth thrust force, and/or a second carrier component may be controlled to direct the fourth thrust force parallel to the vehicle. Operation 714 may be performed by one or more physical processors executing an orientation component that is the same as or similar to orientation component 109 (shown in FIG. 1 and described herein), in accordance with one or more implementations.

At an operation 716, a third angle between the vehicle and the first surface and/or other surfaces may be determined. Operation 714 may be performed by one or more physical processors executing an orientation component that is the same as or similar to orientation component 109 (shown in FIG. 1 and described herein), in accordance with one or more implementations.

At an operation 718, one or more components of vehicle may be controlled. This may include that the first drive component may be controlled to generate a fifth thrust force, the first carrier component may be adjusted to direct the fifth thrust force perpendicular to the vehicle, the second drive control component may be controlled to generate a sixth thrust force, and/or a second carrier component may be controlled to direct the sixth thrust force parallel to the vehicle. Operation 718 is performed by one or more physical processors executing an orientation component the same as or similar to orientation component 109 (shown in FIG. 1 and described herein), in accordance with one or more implementations.

Although the apparatus and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A vehicle configured for navigating surface transitions, the vehicle comprising:
   a chassis having a first end and a second end;
   a first set of support components connected at or near the first end of the chassis, the first set of support components configured for contact with a surface on which the vehicle is navigating;
   a second set of support components connected at or near the second end of the chassis, the second set of support components configured for contact with the surface on which the vehicle is navigating;
   a first drive component comprising a first motor and a first propeller, the first drive component being connected to the chassis via a first carrier component, the first carrier component being configured to provide at least two degrees of rotational freedom of the first propeller with respect to the chassis;
a second drive component comprising a second motor and a second propeller, the second drive component being connected to the chassis via a second carrier component, the second carrier component being configured to provide at least two degrees of rotational freedom of the second propeller with respect to the chassis;
at least one proximity sensor configured to generate an output signal conveying a distance from the chassis to one or more objects detected in the vicinity of the chassis;
at least one orientation sensor configured to generate an output signal conveying an angle between the chassis and the surface in contact with the second set of support components;
a gravitational sensor configured to generate an output signal conveying a direction of a gravitational force upon the vehicle; and
a controller configured to control individual ones of the first set of support components, the first drive component, the second drive component, the first carrier component, and the second carrier component based on output signal from the at least one proximity sensor, the at least one orientation sensor, and the gravitational sensor to facilitate transitioning between surfaces;
wherein the controller is further configured such that navigating a surface transition between a first surface in contact with the first set of support components and the second set of support components and a second surface comprises:
determining the first set of support components has made contact with the second surface based on the output signal from the at least one proximity sensor; and
adjusting orientation of the first carrier component and the second carrier component to control thrust generated by the first drive component and the second drive component based on an angle between the chassis and the first surface, such that:
   based on a determination that the angle is between a first value and a second value, the first drive component is controlled to generate a first thrust force, the first carrier component is controlled to direct the first thrust force perpendicular to the chassis, the second drive component is controlled to generate a second thrust force, and the second carrier component is controlled to direct the second thrust force parallel to the chassis;
   based on a determination that the angle is between the second value and a third value, the first drive component is controlled to generate a third thrust force, the first carrier component is controlled to direct the third thrust force parallel to the chassis, the second drive component is controlled to generate a fourth thrust force, and the second carrier component is controlled to direct the fourth thrust force parallel to the chassis; and
   based on a determination that the angle is between the third value and a fourth value, the first drive component is controlled to generate a fifth thrust force, control the first carrier component is controlled to direct the fifth thrust force parallel to the chassis, the second drive component is controlled to generate a sixth thrust force, and the second carrier component is controlled to direct the sixth thrust force parallel to the chassis.

2. The vehicle of claim 1, wherein the first carrier component comprises a first chassis mount, a second chassis mount, a first orbital support, and a first propeller support;
   wherein the first orbital support is connected to the chassis via the first chassis mount and the second chassis mount, wherein the connection between the first chassis mount and the second chassis mount and the orbital support is configured to facilitate rotation of the first orbital support about a first axis of rotation;
   wherein the rotation of the first orbital support is facilitated by a first motor;
   wherein the first drive component is connected to the first orbital support via the first propeller support; and
   wherein the first propeller support is rotationally connected to the first orbital support to facilitate rotation of the first propeller support about a second axis of rotation.

3. The vehicle of claim 1, wherein the second carrier component comprises a third chassis mount, a fourth chassis mount, a second orbital support, and a second propeller support;
   wherein the second orbital support is connected to the chassis via the third chassis mount and the fourth chassis mount, wherein the connection between the third chassis mount and the fourth chassis mount and the orbital support is configured to facilitate rotation of the second orbital support about a first axis of rotation;
   wherein the rotation of the second orbital support is facilitated by a second motor;
   wherein the second drive component is connected to the second orbital support via the second propeller support; and
   wherein the second propeller support is rotationally connected to the second orbital support to facilitate rotation of the second propeller support about a second axis of rotation.

4. The vehicle of claim 1, wherein the first set of support components is connected at or near the first end of the chassis via a first strut and a second strut; and
   wherein the second set of support components is connected at or near the second end of the chassis via a third strut and a fourth strut.

5. The vehicle of claim 1, wherein the first set of support components comprise a steering assembly.

6. The vehicle of claim 1, wherein the third thrust force is greater than the fifth thrust force and the fourth thrust force is greater than the sixth thrust force.

7. The vehicle of claim 1, wherein the at least one orientation sensor is further configured to measure a turning rate of the second set of support components, or an additional orientation sensor is configured to measure the turning rate of the second set of support components.

8. A vehicle configured for navigating surface transitions, the vehicle comprising:
   a chassis having a first end and a second end;
   a first set of support components connected at or near the first end of the chassis, the first set of support components configured for contact with a surface on which the vehicle is navigating;
   a second set of support components connected at or near the second end of the chassis, the second set of support components configured for contact with the surface on which the vehicle is navigating;
   a first drive component comprising a first motor and a first propeller, the first drive component being connected to the chassis via a first carrier component, the first carrier component being configured to provide at least two degrees of rotational freedom of the first propeller with respect to the chassis;
a second drive component comprising a second motor and a second propeller, the second drive component being connected to the chassis via a second carrier component, the second carrier component being configured to provide at least two degrees of rotational freedom of the second propeller with respect to the chassis;
at least one proximity sensor configured to generate an output signal conveying a distance from the chassis to one or more objects detected in the vicinity of the chassis;
at least one orientation sensor configured to generate an output signal conveying an angle between the chassis and the surface in contact with the second set of support components;
a gravitational sensor configured to generate an output signal conveying a direction of a gravitational force upon the vehicle; and
a controller configured to control individual ones of the first set of support components, the first drive component, the second drive component, the first carrier component, and the second carrier component based on the output signal from the at least one proximity sensor, the at least one orientation sensor, and the gravitational sensor to facilitate transitioning between surfaces;
wherein the controller is further configured such that navigating a surface transition between a first surface in contact with the first set of support components and the second set of support components and a second surface comprises:
determining a distance of the vehicle from the second surface based on the output signal from the at least one proximity sensor;
adjusting orientation of the first carrier component and the second carrier component to control thrust generated by the first drive component and the second drive component based on the distance from the second surface, such that:
responsive to the distance being a first distance, the first drive component is controlled to generate a first thrust force, the first carrier component is controlled to direct the first thrust force perpendicular to the chassis, the second drive component is controlled to generate a second thrust force, and the second carrier component is controlled to direct the second thrust force parallel to the chassis, wherein the control of the first drive component and first carrier component is configured to raise the first end of the chassis off the first surface such that an angle between the chassis and the surface does not exceed a first value;
determining the first set of support components has made contact with the second surface based on the output signal from the at least one proximity sensor; and
adjusting orientation of the first carrier component and the second carrier component to control thrust generated by the first drive component and the second drive component based on the angle between the chassis and the first surface, such that:
based on a determination that the angle is between a second value and a third value, the first drive component is controlled to generate a third thrust force, the first carrier component is controlled to direct the third thrust force parallel to the chassis,
the second drive component is controlled to generate a fourth thrust force, and the second carrier component is controlled to direct the fourth thrust force parallel to the chassis; and
based on a determination that the angle is between the third value and a fourth value, the first drive component is controlled to generate a fifth thrust force, the first carrier component is controlled to direct the fifth thrust force parallel to the chassis, the second drive component is controlled to generate a sixth thrust force, and the second carrier component is controlled to direct the sixth thrust force parallel to the chassis.

9. The vehicle of claim 8, wherein the first carrier component comprises a first chassis mount, a second chassis mount, a first orbital support, and a first propeller support;
wherein the first orbital support is connected to the chassis via the first chassis mount and the second chassis mount, wherein the connection between the first chassis mount and the second chassis mount and the orbital support is configured to facilitate rotation of the first orbital support about a first axis of rotation;
wherein the rotation of the first orbital support is facilitated by a first motor;
wherein the first drive component is connected to the first orbital support via the first propeller support; and
wherein the first propeller support is rotationally connected to the first orbital support to facilitate rotation of the first propeller support about a second axis of rotation.

10. The vehicle of claim 8, wherein the second carrier component comprises a third chassis mount, a fourth chassis mount, a second orbital support, and a second propeller support;
wherein the second orbital support is connected to the chassis via the third chassis mount and the fourth chassis mount, wherein the connection between the third chassis mount and the fourth chassis mount and the orbital support is configured to facilitate rotation of the second orbital support about a first axis of rotation;
wherein the rotation of the second orbital support is facilitated by a second motor;
wherein the second drive component is connected to the second orbital support via the second propeller support; and
wherein the second propeller support is rotationally connected to the second orbital support to facilitate rotation of the second propeller support about a second axis of rotation.

11. The vehicle of claim 8, wherein the first set of support components is connected at or near the first end of the chassis via a first strut and a second strut; and
wherein the second set of support components is connected at or near the second end of the chassis via a third strut and a fourth strut.

12. The vehicle of claim 8, wherein the first set of support components comprise a steering assembly.

13. The vehicle of claim 8, wherein the third thrust force is greater than the fifth thrust force and the fourth thrust force is greater than the sixth thrust force.

14. A method for navigating surface transitions via a vehicle, the method comprising:
determining a first set of support components included within the vehicle in contact with a first surface has made contact with a second surface based on an output signal from at least one proximity sensor included within the vehicle;

adjusting orientation of a first carrier component included within the vehicle and a second carrier component included within the vehicle to control thrust generated by a first drive component included within the vehicle and a second drive component included within the vehicle based on an angle between a chassis included in the vehicle and the first surface, such that:
  based on a determination that the angle is between a first value and a second value, the first drive component is controlled to generate a first thrust force, the first carrier component is controlled to direct the first thrust force perpendicular to the chassis, the second drive component is controlled to generate a second thrust force, and the second carrier component is controlled to direct the second thrust force parallel to the chassis;
  based on a determination that the angle is between the second value and a third value, the first drive component is controlled to generate a third thrust force, the first carrier component is controlled to direct the third thrust force parallel to the chassis, the second drive component is controlled to generate a fourth thrust force, and the second carrier component is controlled to direct the fourth thrust force parallel to the chassis; and
  based on a determination that the angle is between the third value and a fourth value, the first drive component is controlled to generate a fifth thrust force, the first carrier component is controlled to direct the fifth thrust force parallel to the chassis, the second drive component is controlled to generate a sixth thrust force, and the second carrier component is controlled to direct the sixth thrust force parallel to the chassis.

15. The method of claim 14, wherein the first carrier component comprises a first chassis mount, a second chassis mount, a first orbital support, and a first propeller support;
  wherein the first orbital support is connected to the chassis via the first chassis mount and the second chassis mount, wherein the connection between the first chassis mount and the second chassis mount and the orbital support is configured to facilitate rotation of the first orbital support about a first axis of rotation;
  wherein the rotation of the first orbital support is facilitated by a first motor;
  wherein the first drive component is connected to the first orbital support via the first propeller support; and
  wherein the first propeller support is rotationally connected to the first orbital support to facilitate rotation of the first propeller support about a second axis of rotation.

16. The method of claim 14, wherein the second carrier comprises a third chassis mount, a fourth chassis mount, a second orbital support, and a second propeller support;
  wherein the second orbital support is connected to the chassis via the third chassis mount and fourth chassis mount, wherein the connection between the third chassis mount and the fourth chassis mount and the orbital support is configured to facilitate rotation of the second orbital support about a first axis of rotation;
  wherein the rotation of the second orbital support is facilitated by a second orbital motor;
  wherein the second drive component is connected to the second orbital support via the second propeller support; and
  wherein the second propeller support is rotationally connected to the second orbital support to facilitate rotation of the second propeller support about a second axis of rotation.

17. The method of claim 14, wherein the first set of support components is connected at or near a first end of the chassis via a first strut and a second strut; and
  wherein a second set of support components included within the vehicle is connected at or near a second end of the chassis via a third strut and a fourth strut.

18. The method of claim 14, wherein the first set of support components comprise a steering assembly.

19. The method of claim 14, wherein the third thrust force is greater than the fifth thrust force and the fourth thrust force is greater than the sixth thrust force.

20. The method of claim 14, the method further comprising:
  determining a distance of the vehicle from the second surface based on the output from the at least one proximity sensor;
  adjusting orientation of the first carrier component and the second carrier component to control thrust generated by the first drive component and the second drive component based on the distance from the second surface, such that:
    responsive to the distance being a first distance, the first drive component is controlled to generate a seventh thrust force, the first carrier component is controlled to direct the seventh thrust force perpendicular to the chassis, the second drive component is controlled to generate an eighth thrust force, and the second carrier component is controlled to direct the eighth thrust force parallel to the chassis, wherein the control of the first drive component and the first carrier component is configured to raise the first end of the chassis off the first surface.

* * * * *